US008676419B2

(12) United States Patent
Blakemore et al.

(10) Patent No.: US 8,676,419 B2
(45) Date of Patent: *Mar. 18, 2014

(54) TIME-BASED VEHICLE BATTERY BALANCING SYSTEM AND METHOD

(75) Inventors: Bruce Carvell Blakemore, Plymouth, MI (US); Allan Roy Gale, Livonia, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/192,513

(22) Filed: Jul. 28, 2011

(65) Prior Publication Data

US 2013/0030618 A1 Jan. 31, 2013

(51) Int. Cl.
*B60L 11/00* (2006.01)
*H02J 7/00* (2006.01)

(52) U.S. Cl.
USPC .............................. 701/22; 320/133

(58) Field of Classification Search
USPC .............. 701/22, 36; 320/132, 136, 135, 166, 320/162; 324/427, 430, 116, 124, 134; 429/99, 61, 100, 153, 163
See application file for complete search history.

(56) References Cited

U.S. PATENT DOCUMENTS

| | | | |
|---|---|---|---|
| 4,079,303 A | 3/1978 | Cox | |
| 5,659,237 A | 8/1997 | Divan et al. | |
| 5,782,880 A * | 7/1998 | Lahtinen et al. | 607/9 |
| 5,869,951 A | 2/1999 | Takahashi | |
| 6,451,463 B1 | 9/2002 | Tsai et al. | |
| 6,646,419 B1 | 11/2003 | Ying | |
| 7,091,700 B2 | 8/2006 | Kadouchi et al. | |
| 7,245,108 B2 | 7/2007 | Chertok et al. | |
| 7,274,170 B2 | 9/2007 | Benckenstein, Jr. et al. | |
| 7,489,106 B1 | 2/2009 | Tikhonov | |
| 8,207,740 B2 * | 6/2012 | Lin et al. | 324/427 |
| 2003/0152830 A1 | 8/2003 | Eaves | |
| 2006/0119319 A1 | 6/2006 | Sakurai et al. | |
| 2007/0257641 A1 | 11/2007 | Sada et al. | |
| 2008/0197707 A1 * | 8/2008 | Chi Yang | 307/71 |
| 2010/0261048 A1 | 10/2010 | Kim et al. | |
| 2011/0025258 A1 | 2/2011 | Kim et al. | |
| 2011/0078092 A1 * | 3/2011 | Kim et al. | 705/412 |
| 2011/0093223 A1 | 4/2011 | Quet | |

* cited by examiner

*Primary Examiner* — Muhammad Shafi
(74) *Attorney, Agent, or Firm* — David B. Kelley; Brooks Kushman P.C.

(57) ABSTRACT

A power system for a vehicle may include at least one controller and a battery having a plurality of cells. The at least one controller may, for each of the cells, determine a voltage of the cell, determine a discharge time to reduce the voltage to a value approximately equal to a minimum of the determined voltages, and cause the cell to discharge for the discharge time to balance the battery.

3 Claims, 3 Drawing Sheets

TIME-BASED VEHICLE BATTERY BALANCING SYSTEM AND METHOD

BACKGROUND

Vehicle battery rebalancing is performed to correct cell imbalance conditions. The voltage of each of the cells is measured and the cell having the minimum voltage identified. All other cells are bled down via resistive circuitry associated with each cell until the other cells have a measured voltage approximately equal to the minimum. Continuous/periodic cell voltage measurements are taken during the bleed down process to monitor change in the cell voltages. Once all of the cell voltage readings are approximately equal, the battery is charged.

SUMMARY

A vehicle may include an electric machine that generates motive power for the vehicle, a battery having a plurality of cells that store energy for the electric machine, and at least one controller. The at least one controller may, for each of the cells, determine a value of an electrical parameter of the cell, determine a cell discharge time to reduce the determined value of the electrical parameter to a target value, and cause the cell to discharge for the determined duration of time to balance the battery.

A method of balancing a vehicle battery having a plurality of cells may include, for each of the cells, determining a value of an electrical parameter of the cell, determining a discharge time to reduce the determined value of the electrical parameter to a target value, and discharging the cell for the discharge time to balance the vehicle battery.

DETAILED DESCRIPTION

Charge may build up at the surface of cell contacts as energy is removed from cells of a vehicle traction battery, such as during the cell bleed down process described above. This polarization charge may affect attempts to accurately measure cell voltage as energy is removed from the cell: voltage readings may be greater than actual, for example, due to polarization charge. Moreover, other factors such as temperature may introduce error into cell voltage measurements. Inaccurate cell voltage readings may thus confound attempts to rebalance a battery.

Certain embodiments disclosed herein may determine, for each of the cells of a traction battery, the discharge time necessary to bleed the cell down from its current voltage to a target voltage. Hence, continuous/periodic cell voltage measurements during the bleed down process need not be taken. Rather, resistive circuitry associated with each of the cells is activated for the times determined. Once the discharge time associated with each of the cells has expired, the resistive circuitry is deactivated.

Figure 1:
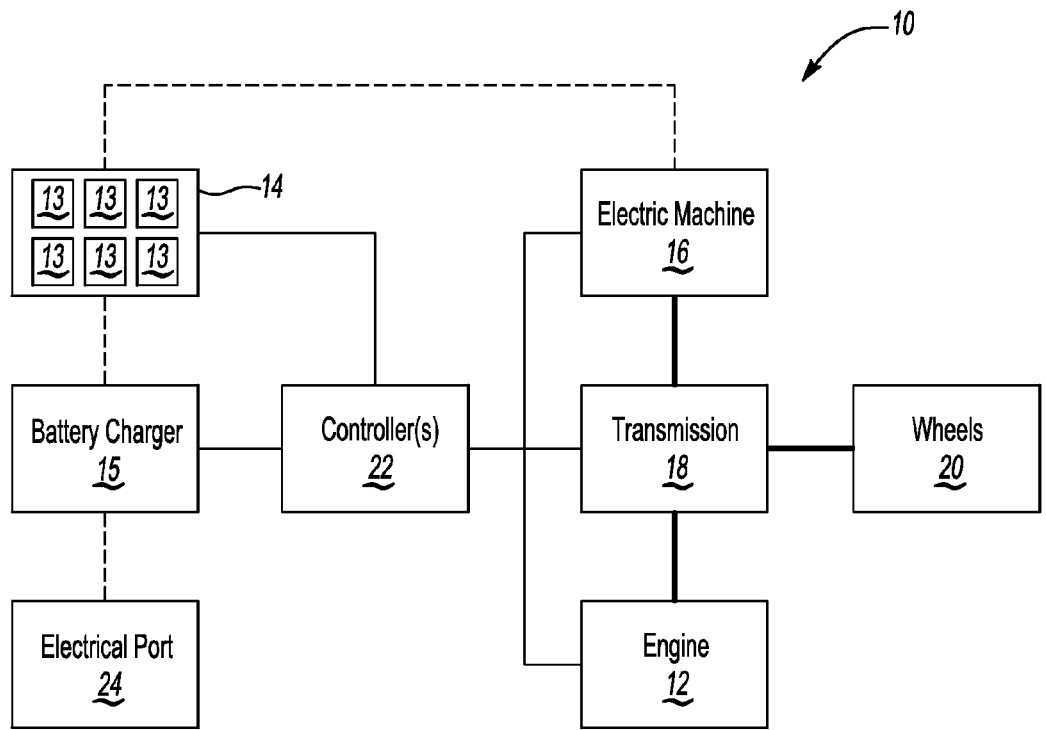
FIG. 1 is a block diagram of an alternatively powered vehicle.

Referring to FIG. 1, an embodiment of a plug-in hybrid electric vehicle (PHEV) 10 may include an engine 12, a plurality of cells 13 forming a traction battery 14, battery charger 15 and electric machine 16. The PHEV 10 may also include a transmission 18, wheels 20, controller(s) 22, and electrical port 24. The engine 12, electric machine 16 and wheels 20 are mechanically connected with the transmission 18 (as indicated by thick lines) in any suitable/known fashion such that the engine 12 and/or electric machine 16 may drive the wheels 20, the engine 12 and/or wheels 20 may drive the electric machine 16, and the electric machine 16 may drive the engine 12. Other configurations, such as a battery electric vehicle (BEV) configuration, etc., are also possible.

The battery 14 may provide energy to or receive energy from the electric machine 16 (as indicated by dashed line). The battery 14 may also receive energy from a utility grid or other electrical source (not shown) via the electrical port 24 and battery charger 15 (as indicated by dashed line).

The controller(s) 22 are in communication with and/or control the engine 12, battery 14, battery charger 15, electric machine 16, and transmission 18 (as indicated by thin lines).

Figure 2:
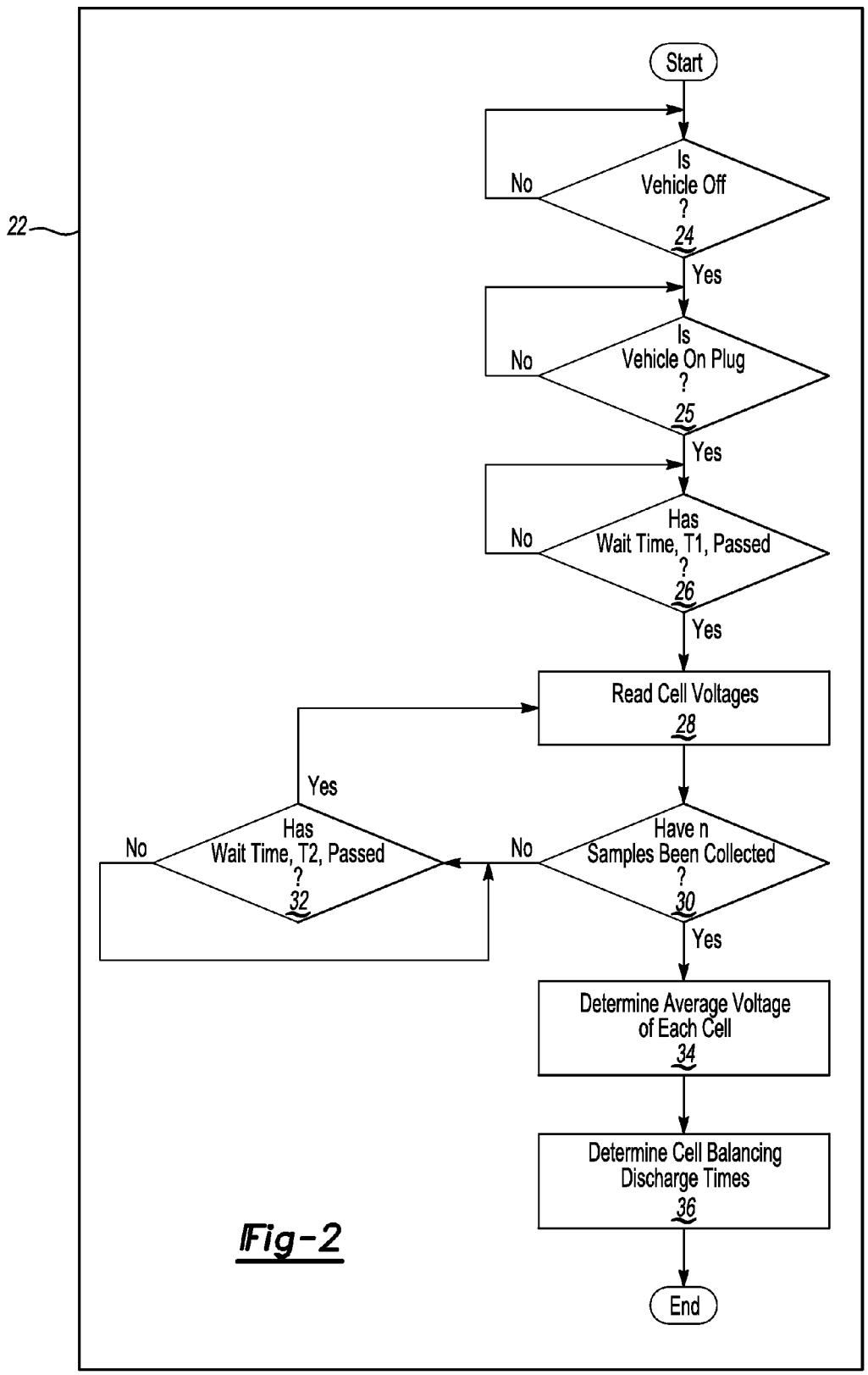
FIG. 2 is a flow chart illustrating an algorithm for determining rebalancing times associated with the battery of FIG. 1.

Referring to FIGS. 1 and 2, the controller(s) 22 determine, in any suitable/known fashion, whether the vehicle 10 is off (e.g., key off) at operation 24. If no, the controller(s) 22 return to operation 24. If yes, the controller(s) 22 determine whether the vehicle 10 is on plug (plugged in), in any suitable/known fashion, at operation 25. If no, the controller(s) 22 return to operation 25. If yes, the controller(s) 22 determine whether a specified wait time, T1, has passed at operation 26. The wait time, T1, may be selected to ensure that any polarization charge accumulated on contacts of the cells 13 has dissipated to the point where its impact on voltage measurement is negligible. In the embodiment of FIG. 2, a wait time, T1, of 1 min. is used. This wait time, however, may vary depending on the type of cells 13, etc. and may be determined, for example, via testing. If no, the controller(s) 22 return to operation 26. If yes, the controller(s) 22 read the voltages of each of the cells 13 at operation 28.

At operation 30, the controller(s) 22 determine whether a specified number of (per cell) voltage measurements, n, have been collected. As explained below, these voltage measurements will be averaged on a per cell basis to generate an average voltage value for each of the cells 13. This time averaging is intended to further minimize the error associated with measuring voltage. n may therefore be selected so as to provide a sufficient number of data points to average out at least some of the effects of measurement error. n is equal to twelve in the embodiment of FIG. 2. n, however, may vary depending on design, etc. and may be determined, for example, via testing, simulation, etc.

If no, the controllers(s) 22 determine whether a wait time, T2, has passed at operation 32. As explained above, time averaging of the voltage measurements seeks to reduce the effects of measurement error. The wait time, T2, may therefore be selected so as to temporally space out the voltage measurements to maximize the benefits of time averaging in reducing the effects of measurement error. A wait time, T2, of 30 sec. is used in the embodiment of FIG. 2. This wait time, however, may vary depending on the type of cells 13, design configuration, etc. and may be determined, for example, via testing, etc. If no, the controller(s) 22 return to operation 32. If yes, the controller(s) 22 return to operation 28.

Returning to operation 30, if yes, the controller(s) 22 determine an average voltage for each of the cells 13 at operation 34. The controllers(s) 22, for example, may sum the voltage measurements for each of the cells 13 and divide the sums by n. At operation 36, the controller(s) 22 determine a cell balancing discharge time for each of the cells 13 based on the voltage measurements determined at operation 30 as discussed below.

Figure 3:
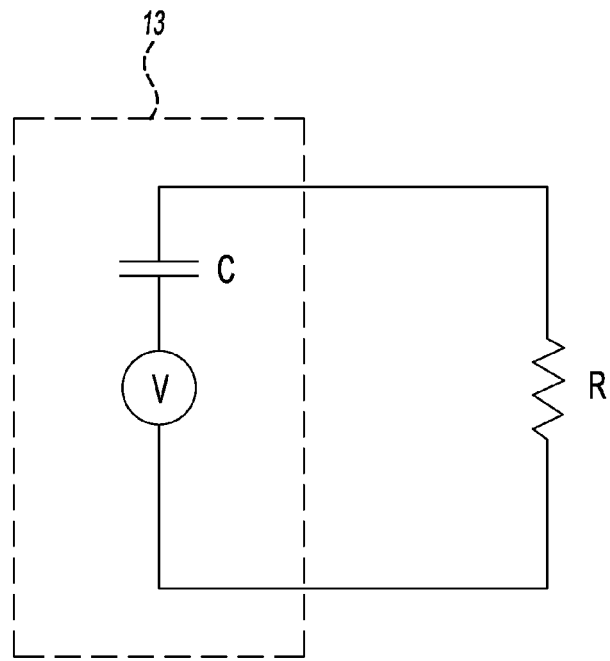
FIG. 3 is a schematic diagram of a battery cell and its resistive circuitry.

Referring to FIGS. 1, 2 and 3, each of the cells 13 (and its associated resistive bleed down circuitry) may be modeled as a standard RC circuit. Hence, the relationship between a current voltage, $v_{current}$, of one of the cells 13 and a target voltage, $v_{target}$, may be given by $$v_{target} = v_{current}(e^{-t/RC}) \quad (1)$$

where $v_{current}$ is the determined cell voltage from operation 34, t is the time constant for the circuit, R is the resistance of the resistive circuitry (e.g., 4 kΩ), and C is the equivalent cell capacitance. C may be written as $$C = I \cdot \frac{dt}{dv} \quad (2)$$

where I·dt is the capacity (A·hrs) in the cell and $$dv = V_{max} - V_{min} \quad (3)$$

where $V_{max}$ is the cell voltage at full state of charge (e.g., 4.0 V) and $V_{min}$ is the cell voltage at 0% state of charge (e.g., 3.1 V). Hence, (2) may be rewritten as $$C = \frac{Ihr_{max}}{V_{max} - V_{min}} \quad (4)$$

where $Ihr_{max}$ is the cell's maximum capacity and may be found according to the relationship $$Ihr_{max} = \frac{\Delta Ihr}{\Delta SOC} \quad (5)$$

where ΔIhr is the change in capacity in the cell and ΔSOC is the change in state of charge of the cell. As an example, the SOC of a given cell may be determined before and after 1 A·hr of capacity is provided to it. Assuming a measured ΔSOC of 10% for this example, the cell's maximum capacity, $Ihr_{max}$, would be 10 A·hrs according to (5).

(1) may be rewritten as $$t = -RC \ln \frac{v_{target}}{v_{current}} \quad (6)$$

Substituting (4) into (6) and assuming that $v_{target}$ is equal to the minimum of the average cell voltages determined at operation 34, the time, t, necessary to discharge one of the cells 13 from its current voltage to the minimum of the voltages determined at operation 34 may thus be determined. (6) may be evaluated for each of the cells 13 of the traction batter 14.

Figure 4:
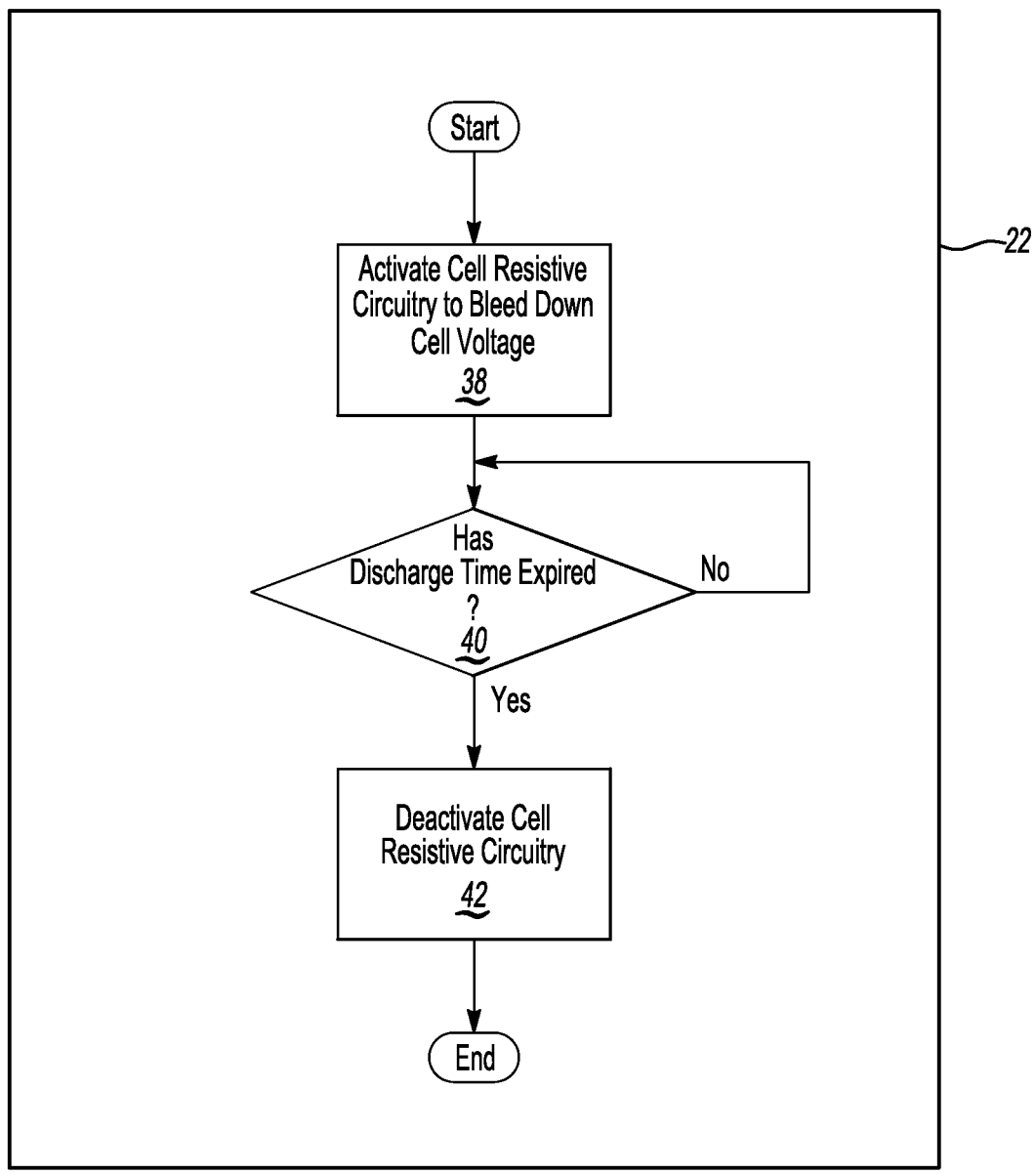
FIG. 4 is a flow chart illustrating an algorithm for bleeding down cell voltages of the battery of FIG. 1.

Referring to FIGS. 1 and 4, the controller(s) 22 activate, for each of the cells 13, the resistive circuitry to bleed down the cell voltages to a minimum at operation 38. The minimum, in this example, is equal to the minimum of the cell voltages determined at operation 34 (FIG. 2). At operation 40, the controller(s) 22 determine whether, for each of the cells 13, the cell's discharge time has expired. If no, the algorithm returns to operation 40. That is, for any of the cells 13 whose discharge time has yet to expire, the algorithm returns to operation 40. If yes, the controller(s) 22 deactivate the cell resistive circuitry at operation 42. That is, for any of the cells 13 whose discharge time has expired, the controller(s) 22 deactivate their resistive circuitry.

Once the resistive circuitry for all of the cells 13 has been deactivated, the controller(s) 22 may then operate to charge the battery to some desired level.

The algorithms disclosed herein may be deliverable to/implemented by a processing device, such as the battery charger 15 or controller(s) 22, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle comprising:
an electric machine configured to generate motive power for the vehicle;
a battery including a plurality of cells configured to store energy for the electric machine; and
at least one controller configured to discharge each of the cells for a predetermined cell discharge time to reduce a current voltage of each of the cells to a target voltage to balance the battery, wherein each of the predetermined cell discharge times (t) is based on a resistance (R) of resistive circuitry associated with the cell, an equivalent capacitance (C) of the cell, the current voltage ($v_{current}$) of the cell, and the target voltage ($v_{target}$) according to the relationship $t = -RC\ln(v_{target}/v_{current})$ and wherein at least some of the predetermined cell discharge times are different.

2. The vehicle of claim 1 wherein the target voltage is a minimum of the initial voltages.

3. The vehicle of claim 1 wherein the at least one controller is further configured to subsequently charge the cells.

* * * * *